May 19, 1925.  1,538,341

S. C. LANCASTER ET AL

GARAGE OR STORAGE BUILDING

Filed Nov. 29, 1920    6 Sheets-Sheet 1

May 19, 1925.  
S. C. LANCASTER ET AL  
1,538,341  
GARAGE OR STORAGE BUILDING  
Filed Nov. 29, 1920   6 Sheets-Sheet 2
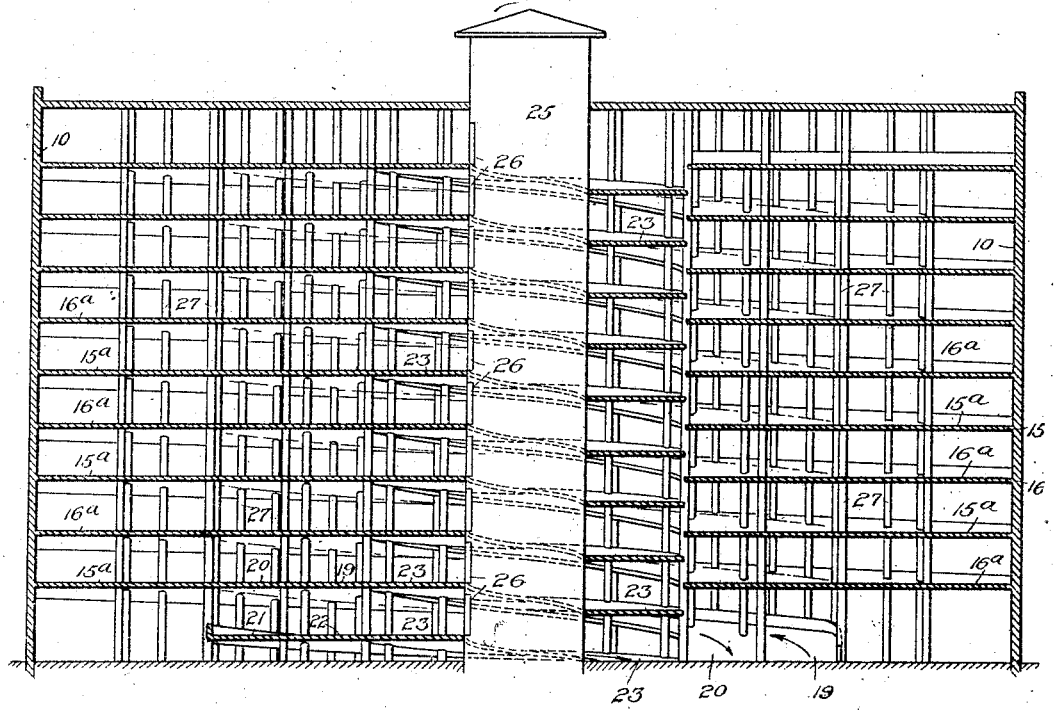
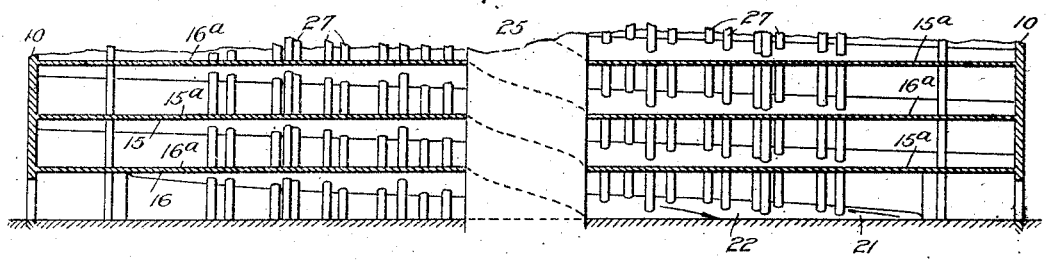
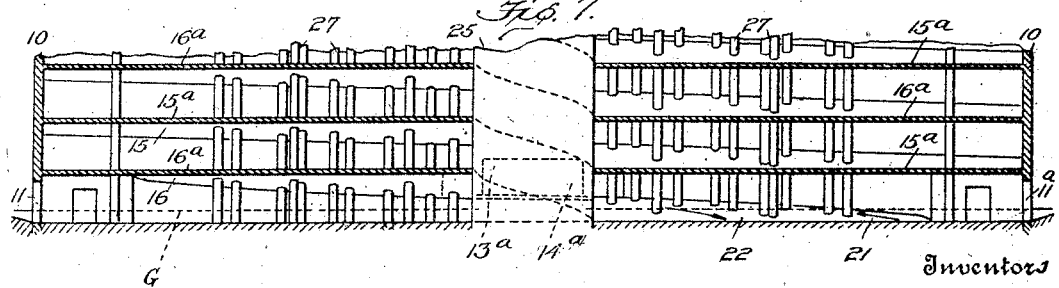

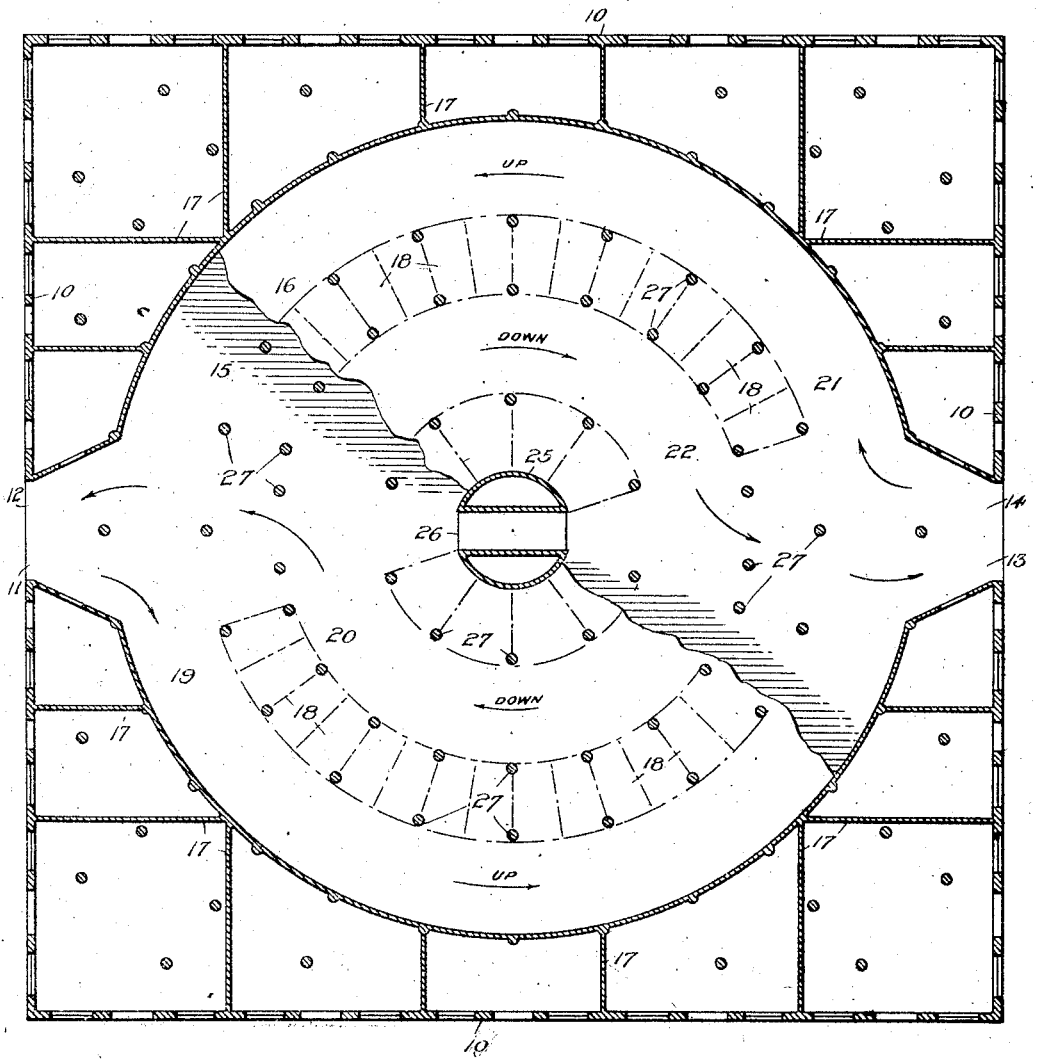

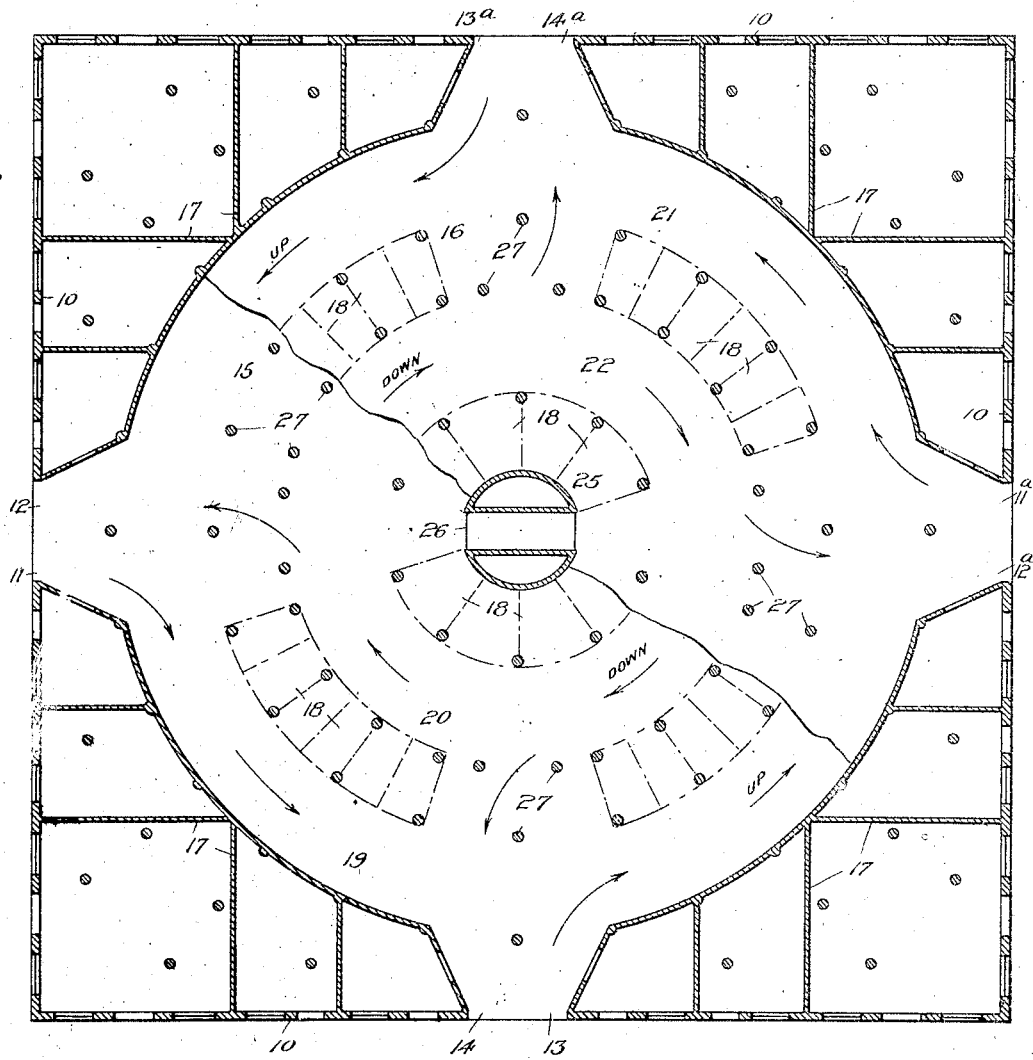

May 19, 1925.

S. C. LANCASTER ET AL 1,538,341

GARAGE OR STORAGE BUILDING

Filed Nov. 29, 1920    6 Sheets-Sheet 5

May 19, 1925.  
S. C. LANCASTER ET AL  
1,538,341  
GARAGE OR STORAGE BUILDING  
Filed Nov. 29, 1920  
6 Sheets-Sheet 6

Witness  
Edwin L. Bradford

Inventor  
Samuel C. Lancaster and  
C. O. Hjermstad  
By Church & Church  
their Attorneys Patented May 19, 1925.

1,538,341

UNITED STATES PATENT OFFICE.

SAMUEL C. LANCASTER AND CHRISTIAN O. HJERMSTAD, OF PORTLAND, OREGON, ASSIGNORS TO AUTOWHIRL CORPORATION, OF CHICAGO, ILLINOIS, A CORPORATION OF ILLINOIS.

GARAGE OR STORAGE BUILDING.

Application filed November 29, 1920. Serial No. 427,097.

*To all whom it may concern:*

Be it known that we, SAMUEL C. LANCASTER and CHRISTIAN O. HJERMSTAD, citizens of the United States, residing at Portland, in the county of Multnomah and State of Oregon, have invented certain new and useful Improvements in Garages or Storage Buildings; and we do hereby declare the following to be a full, clear, and exact description of the same, reference being had to the accompanying drawings, forming part of this specification.

This invention relates to garages or storage buildings for automobiles and other vehicles.

One object of the invention is to provide a garage or storage building covering a small area that will possess a comparatively large capacity for the storage of vehicles, the building being particularly adaptable as a garage for automobiles.

A further object of the invention is to construct the building in such wise that the driveways for bringing the vehicles into and out of the building will not be overtaxed, this being a result quite frequently occurring where a large number of vehicles are kept in a building with but one entrance and exit opening.

A further object is to provide easy communication between the driveways for the incoming and outgoing vehicles and between both of said driveways and the places where the vehicles are stored.

According to the present invention the building is preferably designed for location on a rectangular area and as the said structure is to accommodate large numbers of machines it may occupy an entire city block. Another object, therefore, is to arrange the floors or storage platforms in such manner that any two or more of the sides of the building may each have an entry and an exit opening therein to provide ready access to the building from two or more streets.

In the accompanying drawings,—

Fig. 2 is a vertical sectional view of the structure shown in Fig. 1;

Fig. 3 is a horizontal sectional view of a modified form of construction;

Fig. 4 is a similar view of another embodiment of the present invention;

Fig. 6 is a sectional elevation of the structure shown in Fig. 3; and

Fig. 7 is a similar view of the structure shown in Fig. 4.

Figure 1:
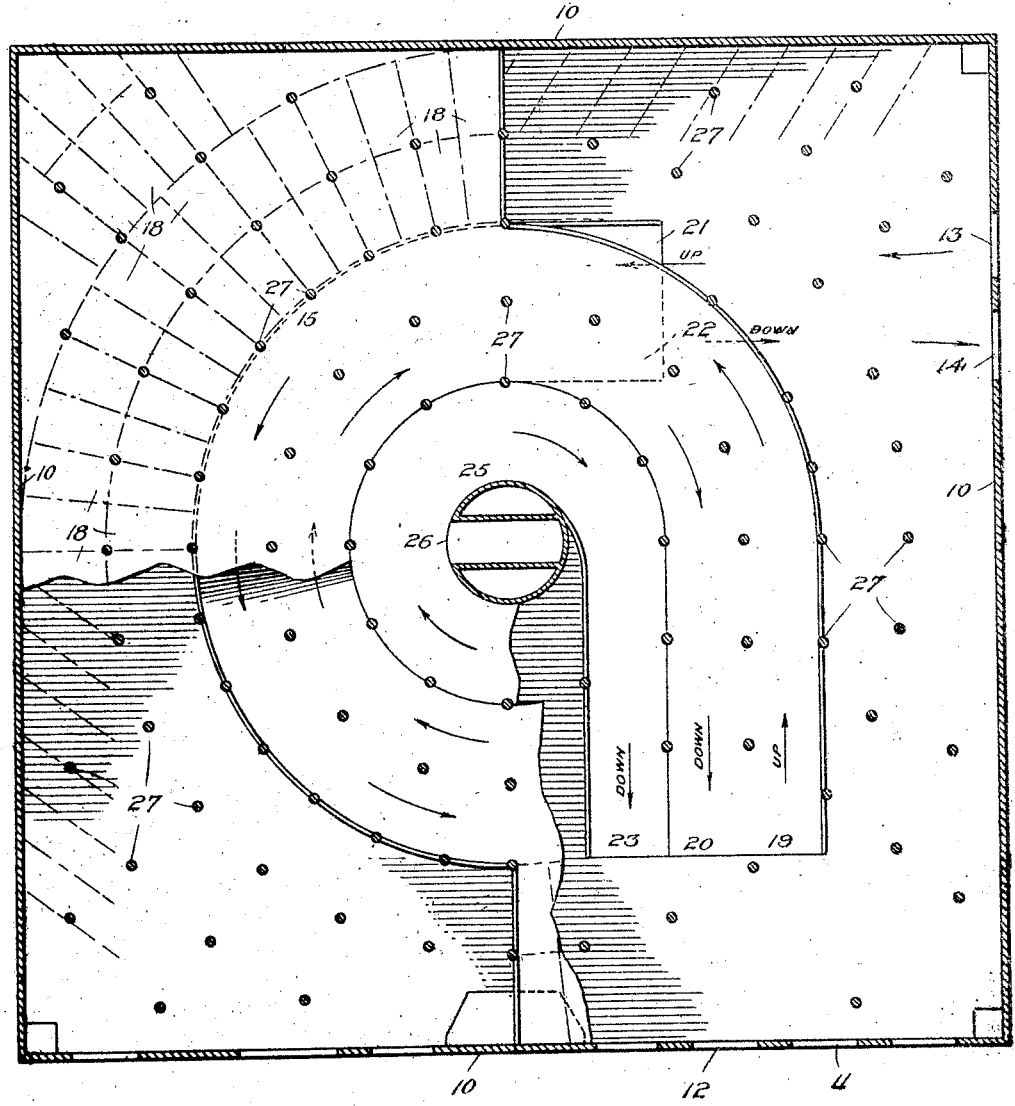
Figure 1 is a horizontal sectional view of a building embodying the present improvements.

Garages of the type to which the present invention relates are generally, if not always, located in those sections of cities where ground is more or less valuable and the present invention therefore seeks to greatly increase the number of machines that can be accommodated in proportion to the area occupied by the building. A garage constructed in accordance with the present invention may be of any desired size, depending upon the number of machines to be accommodated, but it is preferably designed with a rectangular outer wall 10 as the corners may well be utilized as storage rooms and for passenger elevators or spaces for vehicles or for other purposes; whereas, a building with a circular outer wall would not only possess less floor space, but it would also leave portions of ground that could not be advantageously utilized. Furthermore, a building possessing a rectangular formation, together with other structural features contemplated by the present invention, is highly adaptable for occupying a corner lot in that it can be provided with entrance and exit openings on each street, or the building, if the volume of business warranted, can occupy an entire city block of ground and be provided with an entrance and exit opening on each of the four streets. Structures such as these are shown in the drawings, Fig. 1 illustrating a garage adapted to occupy a corner lot and provided with entrance and exit openings 11, 12 situated on one side and similar openings 13, 14 on one of the adjacent sides; Fig. 3 shows a garage provided with entrance and exit openings 11, 12, 13 and 14 on two streets running parallel to each other, this form being desirable where the building is located in the middle of a block and extends through from one street to another; and Fig. 4 shows a building having entrance and exit openings on each of its four sides, this form being preferred where the building occupies the entire block.

Figure 8:
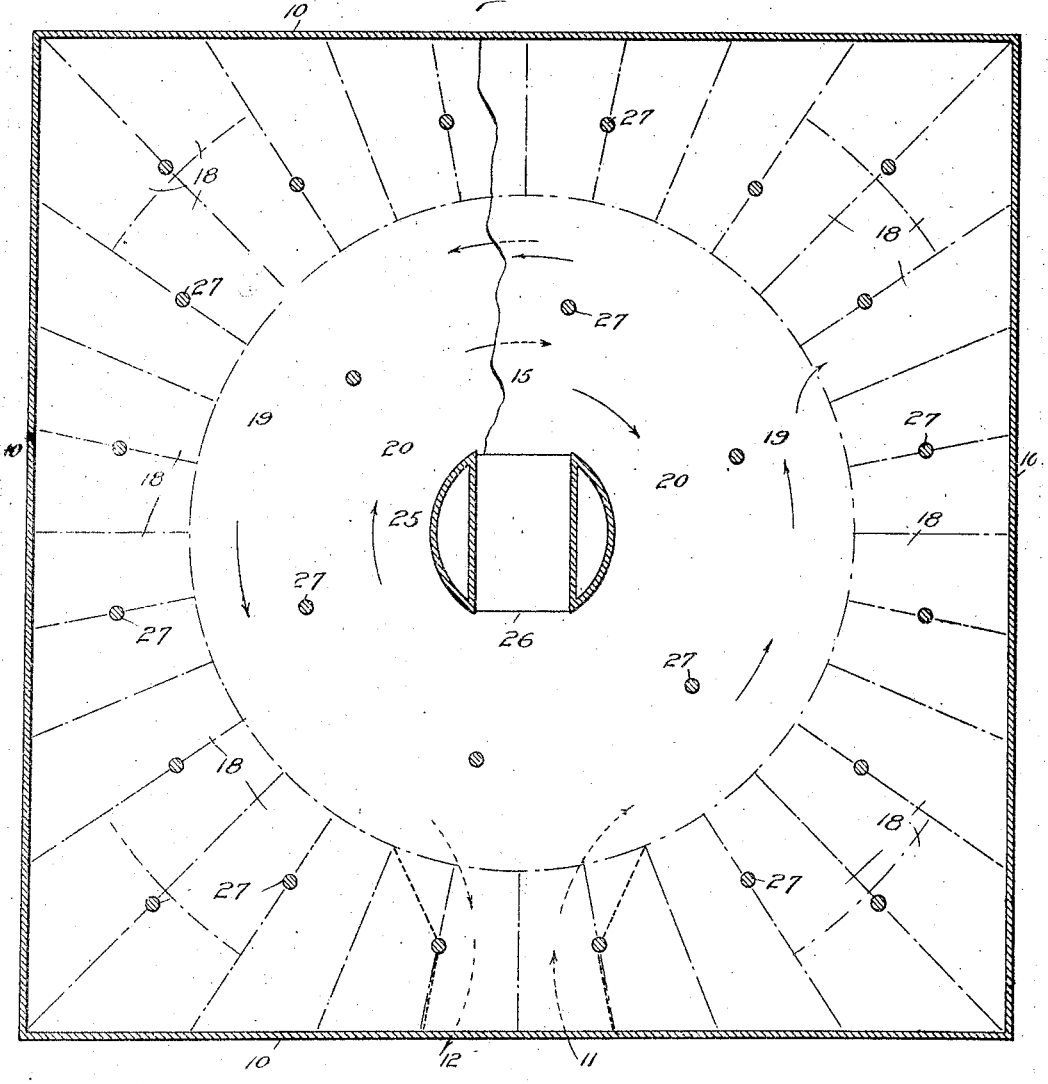
Fig. 8 shows a further modification of the invention.

In each type of building the machines are stored on a series of platforms or floors formed by the convolutions of one or more spirally arranged continuous floors, each spiral, where two or more are utilized, being constructed separate from the other. The preferred construction of garage contains two continuous upward spiral floors, indicated at 15 and 16, respectively, although, in other forms of buildings falling within the scope of the present invention this number may be increased or, if desired, only one continuous floor with driveways arranged on the same plane for ascending and descending machines, may be employed, as shown in Fig. 8. The convolutions 15$^a$ of one spiral are located between the convolutions 16$^a$ of the other, in the two spiral construction, the pitch of both spirals being such that the distance between adjacent convolutions is maintained uniform throughout the height of the building and affords sufficient clearance for the machines on either spiral. In actual construction each floor is given a rise of approximately twenty feet to each convolution, this giving a clearance of ten feet between the platforms or convolutions, a distance ample for practically all machines.

On the ground floor, the outer portions of the building are divided by partitions 17 into suitable office rooms, stores, etc., but after the spirals 15 and 16 have reached a point above the ground floor the outer portions of each floor are divided into parking or storage spaces 18 indicated in the drawings by dot and dash lines and denoted in the garage itself by painted lines, if desired, or by any other suitable means such as light partitions.

For ascending to and descending from the storage spaces 18, two driveways 19, 20, one for incoming machines and the other for outgoing machines, are provided for spiral 15 and two similar driveways 21, 22 are provided for spiral 16. Both driveways of the respective floors extend upwardly in the same direction as the floor and are of the same pitch, the surface of the driveways and the storage spaces of the respective spirals forming a continuous unbroken surface and permitting a car to be driven from one driveway to the other, or from the driveways to and from the storage spaces without the necessity of pulling over any abrupt rise in the floor surface. This allows a driver to run his machine from its place of storage directly on to the descending driveway, thereby eliminating the necessity of machines traveling in opposite directions on the same driveway, such as is the case in some garages of this type disclosed in the prior art.

A further structural feature present in the form of garage shown in Figs. 1 and 2 is that a second driveway 23 for outgoing machines is also provided, but the pitch of this last driveway is approximately one-half of the other and, as shown in Fig. 2, communicates with each convolution or platform of both of the spiral floors 15, 16. This extra driveway 23 not only aids in relieving traffic on the other outgoing driveways of the floors, but it also permits a driver to descend slowly without the application of the braking force that would be necessary to restrain a machine on the other driveway to the same extent.

Figure 5:
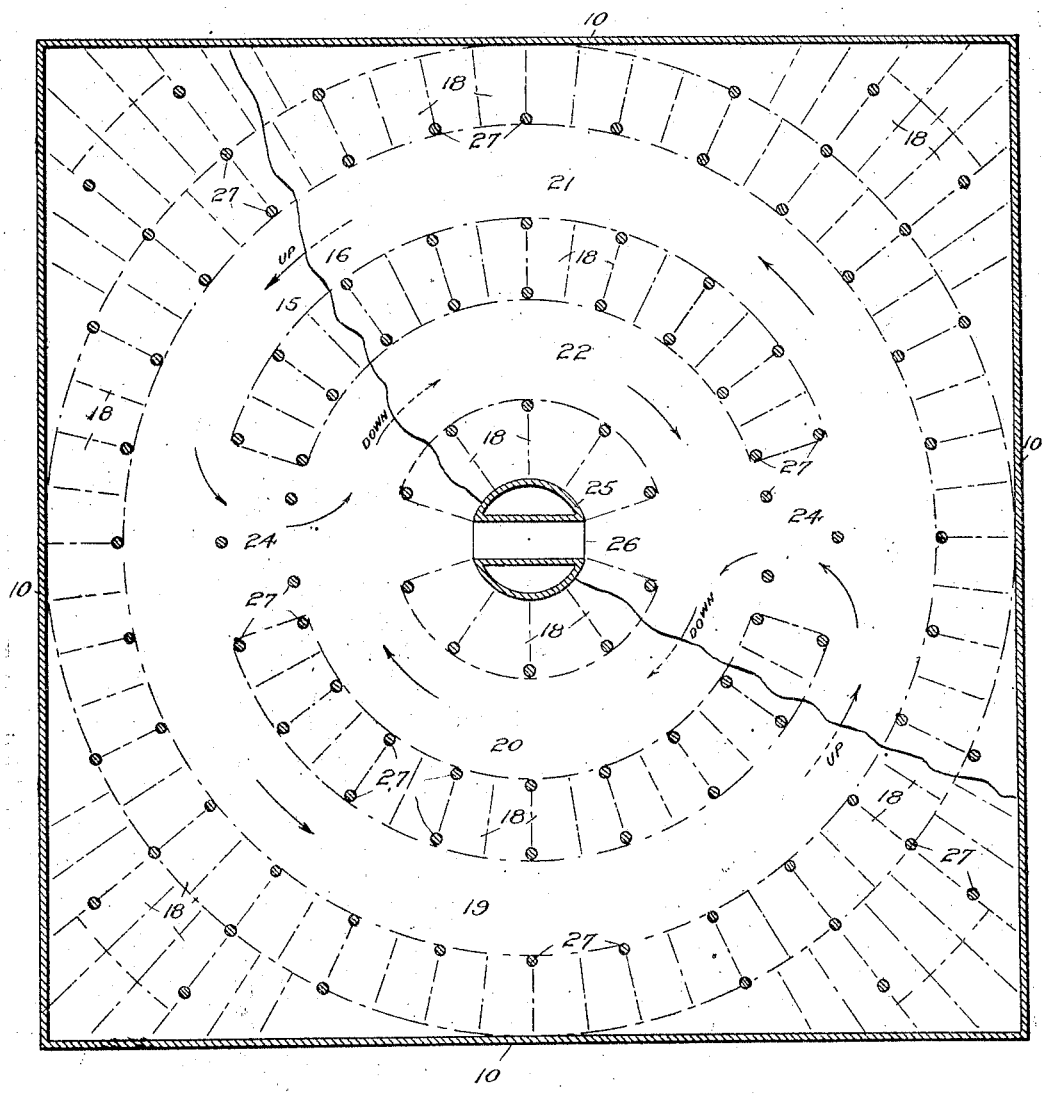
Fig. 5 is a horizontal sectional view of the structures shown in Figs. 3 and 4, this view being taken at a point well above the entrance and exit openings.

Referring to the form of building shown in Fig. 3, the opposite side walls 10 are each provided with an entrance and exit opening. Stores, office rooms, etc., are provided on the ground floor in this type also and the convolutions of the two spiral floors also run in the same direction. Above the ground floor the incoming and outgoing driveways 19, 20 and 21, 22 are spaced apart radially of the building and the space between them utilized for storage spaces, passages 24 being left between some of the storage spaces to allow communication between the two driveways, all as clearly shown in Fig. 5. Both driveways of each floor are on the same level and the space within the inner driveway is utilized for storage purposes instead of an extra driveway, as in the form shown in Fig. 1.

The type of garage illustrated in Fig. 4 is quite similar to that last described, differing only in that each side of the building is provided with an entrance and exit opening, the entrance and exit openings 11, 12, 13 and 14 on two of the adjacent sides communicating with spiral 15 and the openings 11$^a$, 12$^a$, 13$^a$ and 14$^a$ on the other two sides communicating with the spiral 16. The proper clearance between the convolutions of the two spirals is secured by the entrance and exist openings 11, 12, 11$^a$ and 12$^a$ on opposite sides of the building being located preferably two and one-half feet below the ground (the ground line is indicated by the line G in Fig. 7) and the entrances 13, 14, 13$^a$, 14$^a$ on the other two sides located the same distance above the ground, suitable runways being provided for each opening on the exterior of the building.

The several openings being arranged in these positions, spiral 15, starting at the entrance 11, two and one-half feet below the ground, rises to the entrance 13 on the adjacent side, two and one-half feet above the ground, a rise of five feet in one-quarter of a convolution and continuing to the next adjacent entrance 11$^a$ it rises another five feet, and, opening 11$^a$ being two and one-half feet below the ground, a clearance of ten feet is provided between the two platforms or convolutions of the two spirals. With this exception, this form of structure is like the type shown in Figs. 3 and 5 and further description is thought unnecessary.

By providing two separate floors, each with its own driveways, the amount of traffic on each floor is reduced to practically one half of what it would be if all the machines were stored on one floor and had to use the same driveway. This is an important feature because the number of machines accommodated in garages of this type is very great, ranging from one to two thousand machines, and the congestion that would result if all the machines used the same driveway can readily be realized.

Delivery or removal of machines to and from the place of storage, particularly those on the higher convolutions or platforms, is further facilitated by the provision of an elevator (not shown) of any approved type located centrally of the building, each convolution or platform of both spirals communicating with the elevator shaft 25 through doorways 26. (See Figs. 1 and 2.)

In the form shown in Fig. 8 only one spiral 30 is provided but, as in the other types of buildings, both the incoming and outgoing driveways are on the same level throughout their length with the adjacent storage spaces. In other respects this type is not different from the others and the same reference numerals have, therefore, been utilized for designating like parts.

As both the incoming and outgoing driveways communicate with their respective floors throughout the length of the latter, the spirals need not necessarily terminate at the ground but may, if desired, continue down below the ground in the form of a basement, thus adding to the capacity of the building without increasing the ground occupied.

While any mode of construction may be adopted in carrying out the present invention, a reinforced concrete construction is more economical and advantageous in that all partitions can be dispensed with above the ground floor, the convolutions receiving the necessary support through columns 27 spaced apart sufficiently to allow the passage of machines to and from their storage places.

What is claimed is:

1. A building for the storage of automobiles and other vehicles, embodying a plurality of separate, continuous spiral floors having storage spaces thereon, an upward spiral driveway for each floor for incoming vehicles, and a spiral driveway for each floor for outgoing vehicles, the driveways communicating with their respective floors throughout their length.

2. A building for the storage of automobiles and other vehicles, embodying a plurality of separate, continuous spiral floors, a driveway for each floor for incoming vehicles, each incoming driveway communicating with its floor throughout its length, and a driveway for outgoing vehicles for each floor, each outgoing driveway communicating with its floor and with the incoming driveway on its floor throughout its length.

3. A building for the storage of automobiles and other vehicles, embodying a continuous spiral floor, a second continuous spiral floor having its convolutions interposed between those of the first mentioned floor, driveways on each floor for incoming and outgoing vehicles, and a separate driveway communicating with each convolution of both of said floors.

4. A building for the storage of automobiles and other vehicles, embodying two continuous upward spiral floors, the convolutions of one floor being interposed between those of the other floor, a pair of driveways for incoming and outgoing vehicles communicating with one floor throughout its length, a second pair of similar driveways communicating with the other floor throughout its length, and a separate driveway for outgoing vehicles communicating with both floors.

5. A building for the storage of automobiles and other vehicles, embodying two continuous spiral floors, the convolutions of one floor being interposed between those of the other, a pair of driveways for incoming and outgoing vehicles communicating with one floor, a second pair of similar driveways communicating with the other floor, and a separate spiral driveway for outgoing vehicles communicating with each convolution of both floors.

6. A building for the storage of automobiles and other vehicles, embodying two continuous spiral floors, a pair of driveways for incoming and outgoing vehicles for one floor, a second pair of similar driveways for the other floor, a separate spiral driveway for outgoing vehicles communicating with each convolution of both floors, and an elevator shaft communicating with each convolution of the last mentioned driveway.

SAMUEL C. LANCASTER.
CHRISTIAN O. HJERMSTAD.